United States Patent [19]

Maison

[11] 3,739,582

[45] June 19, 1973

[54] THRUST REVERSING APPARATUS
[75] Inventor: Richard L. Maison, San Diego, Calif.
[73] Assignee: Rohr Industries, Inc., Chula Vista, Calif.
[22] Filed: Apr. 13, 1972
[21] Appl. No.: 243,881

Related U.S. Application Data
[63] Continuation of Ser. No. 45,138, June 10, 1970.

[52] U.S. Cl............... 60/226 A, 60/230, 60/265.29
[51] Int. Cl............................................. F02k 3/02
[58] Field of Search ................... 60/226, 224, 228, 60/230; 239/265.19, 265.24, 265.29, 265.31

[56] References Cited
UNITED STATES PATENTS

| | | | |
|---|---|---|---|
| 2,847,823 | 8/1958 | Brewer............................. | 239/265.29 |
| 2,945,346 | 7/1960 | Arnzen ............................ | 239/265.29 |
| 3,279,182 | 10/1966 | Helmintoller...................... | 60/226 A |
| 3,344,604 | 10/1967 | Matlia.............................. | 60/226 A |
| 3,475,913 | 11/1969 | Mortlock .......................... | 60/226 X |
| 3,601,992 | 8/1971 | Maison ............................ | 60/226 A |
| 3,605,411 | 9/1971 | Maison ............................ | 60/226 A |

Primary Examiner—Clarence R. Gordon
Attorney—George E. Pearson

[57] ABSTRACT

Fan jet engine has cowl surrounding engine and terminating in jet exhaust nozzle. ELongate streamlined shroud surrounds fan and engine to define annular duct for fan air terminating forward of exit end of nozzle. Reverser includes peripherally arranged outflow passage means extending through inner and outer walls of shroud forward of its trailing edge. Plurality of sets of control doors peripherally arranged in passage means. Each set includes a blocker door pivoted aft to converge forward toward axis of engine, and combination of blocker doors forms frusto-cone when deployed to block rearward flow and divert it laterally to passage means. Each set also includes two or more deflector doors at outer wall of shroud pivoted aft to deploy to forward diverging attitude to produce cascade effect and direct exiting air outward with forward flow component to produce reverse thrust. Deflector doors deploy through a greater angle than blocker doors and passage means has greater flow area than duct to prevent back pressure in duct.

8 Claims, 4 Drawing Figures

PATENTED JUN 19 1973 3,739,582

INVENTOR.
RICHARD L. MAISON

BY

George E. Pearson
ATTORNEY

INVENTOR.
RICHARD L. MAISON
BY
George E. Pearson
ATTORNEY

THRUST REVERSING APPARATUS

This is a continuation of application Ser. No. 45,138, filed June 10, 1970.

BACKGROUND OF THE INVENTION

This invention lies in the field of gas turbine engines, commonly called jet engines, which produce reaction thrust by ejecting a high velocity stream of gas from the exhaust nozzle of the gas turbine, and is directed to thrust reversing apparatus for the front fan type of jet engine in which a nacelle or shroud surrounds the engine and is spaced outwardly from the core engine cowl to define an annular passage or duct for flow of air rearwardly from the outer portion of an enlarged axial flow compressor. In this type of engine, a large proportion of the total thrust is developed by the reaction to the air driven rearward by the fan and the balance results from ejection of the exhaust gas stream from the turbine.

As is the case with all jet type engines, the airplanes which are equipped with them have high landing speeds which place a heavy burden on the wheel brakes. To reduce this burden, most such airplanes are provided with means to reverse the direction of flow of the jet stream during landing runs to produce a reverse thrust. Many different types of thrust reversers have been developed and used for this purpose. All of them utilize a basic principle of blocking rearward flow of the jet stream and diverting it laterally and forwardly. One type uses blocker doors swung directly behind the jet nozzle and diverging forwardly. Another type uses openings in the side walls of the nozzle or a surrounding shroud together with blocker doors which swing toward the engine axis to block rearward flow and extend outward to direct the diverted flow laterally and forwardly. Still another type utilizes cascade sets in the side walls of the jet or shroud with various means to block rearward flow and uncover the cascades. All of these have various merits and have been used successfully. Their principal problems have been cost, weight, and complexity with resultant high maintenance expense.

SUMMARY OF THE INVENTION

The present invention obtains the benefits mentioned above while providing an apparatus which adds very little weight or complexity, with relatively few machined parts, thus reducing initial cost as well as maintenance expense. Generally stated, the apparatus includes an elongate shroud which surrounds the fan and engine and provides an annular duct for the rearward flow of fan air, the duct terminating forward of the exit end of the exhaust gas nozzle. Peripherally arranged outflow passage means is provided a short distance forward of the trailing edge of the shroud and extends through the inner and outer walls of the shroud. The passage means may comprise several discrete passages, preferably about eight or a single continuous passage with spaced axially extending support structures connecting the aft section of the shroud to the main body.

In either type of passage means there are a plurality of peripherally adjacent sets of control doors. Each set includes a blocker door and two or more deflector doors. The blocker doors are pivotally mounted at their aft ends on transverse axes to swing from stowed position in the inner end of the passage means to deployed position converging forwardly toward the engine axis with their forward ends in contact with the engine cowl. In this position, the combined blocker doors are shaped to move in closely spaced relation with respect to each other to form a frusto-cone which prevents the fan air from flowing rearward out the exit end of the shroud and diverts it gradually and smoothly rearward and outward to the passage means.

The two or more deflector doors of each set are arranged in tandem fashion in the passage means at the outer wall of the shroud and close that portion of the exit of the passage means. The deflector doors are pivotally mounted at their aft ends on transverse axes parallel to the pivotal axis of the blocker door, and these axes are spaced fore and aft. In stowed position the adjacent fore and aft edges of the deflector doors engage each other to seal the opening and also to present a streamlined surface defining a part of the contour of the shroud outer wall. In deploying, the deflector doors swing outward and rearward so that they diverge forward and are substantially parallel in axially spaced relation. Thus they provide a cascade effect and direct the exiting fan air outward with a forward flow component which produces the desired reverse thrust.

The flow area of the passage means is made substantially greater than the flow area of the duct in order to prevent any back pressure in the duct. Also the deflector doors swing through a greater deploying angle, about 60°, than the deploying angle of the blocker doors, which is about 45°. The doors may be actuated by any suitable servo motor means, and all of the doors in a set may be actuated by a single servo motor or the deflector doors may be actuated separately from the blocker door. In any event, the opening rate of the deflector doors should always be enough greater than the closing rate of the blocker doors to avoid back pressure buildup.

BRIEF DESCRIPTION OF THE DRAWINGS

Various other advantages and features of novelty will become apparent as the description proceeds in conjunction with the accompanying drawings, in which.

DESCRIPTION OF PREFERRED EMBODIMENT

Figure 1:
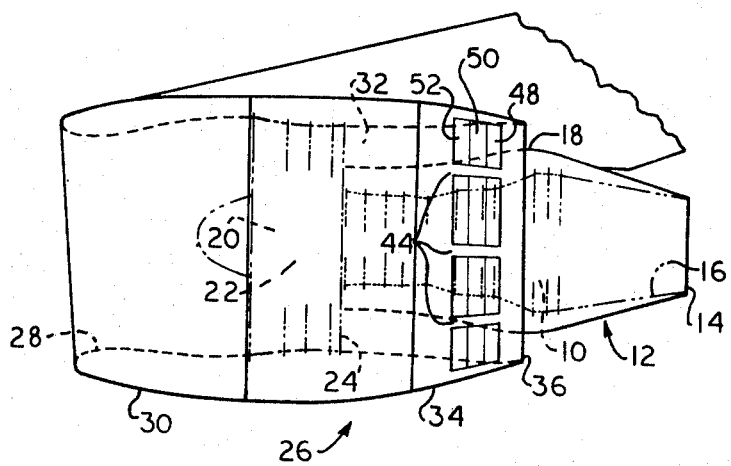
FIG. 1 is a schematic side view of an engine installation.

The apparatus of this invention is generally schematically illustrated in FIG. 1, in which the engine 10 is encased within a core cowl 12 which terminates rearwardly at the exit 14 of the exhaust gas nozzle or tail pipe 16, the greatest diameter of the cowl being at an intermediate locus 18. At its forward end, the engine is provided with an axial flow compressor or fan 20, the radially inner portion 22 of which directs combustion air into cowl 12 and the radially outer portion 24 of which drives a jet or fan air stream rearward outside of the cowl to directly product jet thrust. Surrounding the fan and engine is an elongate generally annular shroud 26 having radially spaced inner and outer walls 28 and 30. The inner wall 28 is radially spaced from cowl 12 to form an annular duct 32 for rearward flow of the fan air stream. While a forward fan type is shown, the apparatus is applicable to an aft fan type in the same way.

In the aft section 34 of the shroud, the inner and outer walls converge to form a thin trailing edge 36 defining an air jet nozzle exit in a transverse plane substantially at locus 18. In the zone between the fore and aft sections of the shroud a plurality of openings 38 and 40, preferably eight, are formed through the inner and outer walls to produce outflow passage means 42 for flow of exiting air during reverse thrust operation. While the passages are illustrated as separate and distinct and peripherally spaced, the concept includes a continuous peripheral passage with peripherally spaced axially extending support structures to unite the aft section structurally with the fore section. The structures 44 are essentially the same in both concepts.

In the presently preferred form, the blocking and reversing mechanism includes a plurality of sets of control doors, one set located in each of the passages 42 or peripherally separated by internal support structures when the passage opening is continuous. Each set comprises a blocker door 46 and two or more deflector doors 48, 50, 52, all of the doors being shown in stowed position in FIG. 2, and fully deployed position in FIG. 3.

Considering first the blocker door of a set and its function, it will be seen that door 46 is pivotally mounted at its aft end at 54 to swing about a transverse axis. As it deploys, its forward end 56 moves inward to the fully deployed position of FIG. 3 and into contact with the core cowl 12. It thus converges forward toward the engine axis. The adjacent side edges 58 of the several blocker doors juxtapose in this position to form a frusto-cone which blocks rearward flow of fan air through the exit at 36 and diverts it smoothly and gradually rearward and outward to passage means 42. Door 46 may be stowed and deployed by any suitable actuating mechanism. An exemplary type is illustrated as an actuator 60 having a cylinder 62 and piston rod 64. The outer end 68 of rod 64 is stabilized by guide tracks 66 which are fixedly mounted to shroud 26. The rod is slidably mounted in the cylinder to produce straight line motion of outer end 68 which is pivotally connected at 70 to a force transmitting link 72, which in turn is pivotally connected at 74 to a bracket 76 on the blocker door.

Deflector doors 48, 50, 52 are arranged in tandem relation in the outer end of passage 42 and in stowed position their adjoining fore and aft edges are in engagement so that the combined doors effectively close the opening, and their outer walls define a portion of the contour of the shroud outer wall. Door 48 is somewhat longer axially than the other doors and is pivotally mounted at its aft end at 78 about a transverse axis parallel to the axis of mounting 54. Doors 50 and 52 are mounted at their aft ends on arms 80 and 82, and these arms in turn are pivotally mounted at 84 and 86 on transverse axes parallel to the axis of mounting 78 and in fore and aft spaced relation. The mounting axes of the three deflector doors 48, 50 and 52 mounted in each passage 42 are spaced apart axially of the shroud to provide a radially outward and forwardly deflected flow of fan air as indicated by the arrows in FIG. 3.

To produce movement of the deflector doors in unison, any simple linkage mechanism may be employed. As illustrated, a link 88 is pivotally connected at 90 to door 48 and at 92 to door 50. A second link 94 is pivotally connected at 92 and at 96 to bracket 98. As previously stated, these doors may be operated by a separate servo motor but for simplicity they are shown as being operated by actuator 60. For this purpose, a third link 100 is pivotally connected at 102 to bracket 98 on door 52 and at 70 to the end 68 of the piston rod 64. Thus, all of the doors are operated in unison. The relative rate of deployment may be varied for design considerations by changing the length of the various links or their points of connection.

Figure 2:
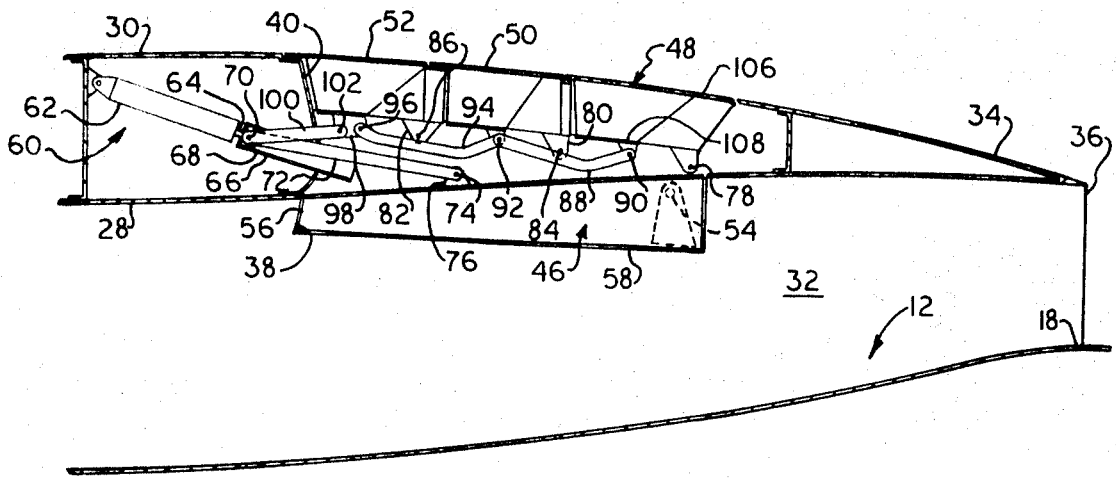
FIG. 2 is a schematic sectional view of a portion of the aft end of the shroud with the doors in stowed position.
Figure 4:
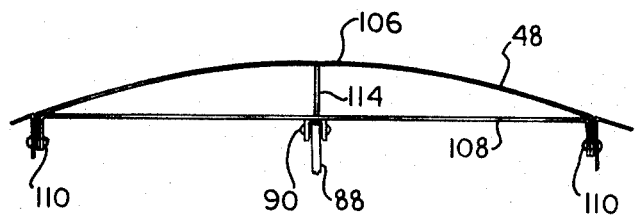
FIG. 4 is an end view of door 48 taken on line 4—4 to illustrate the multi-vane cascade structure.
Figure 3:
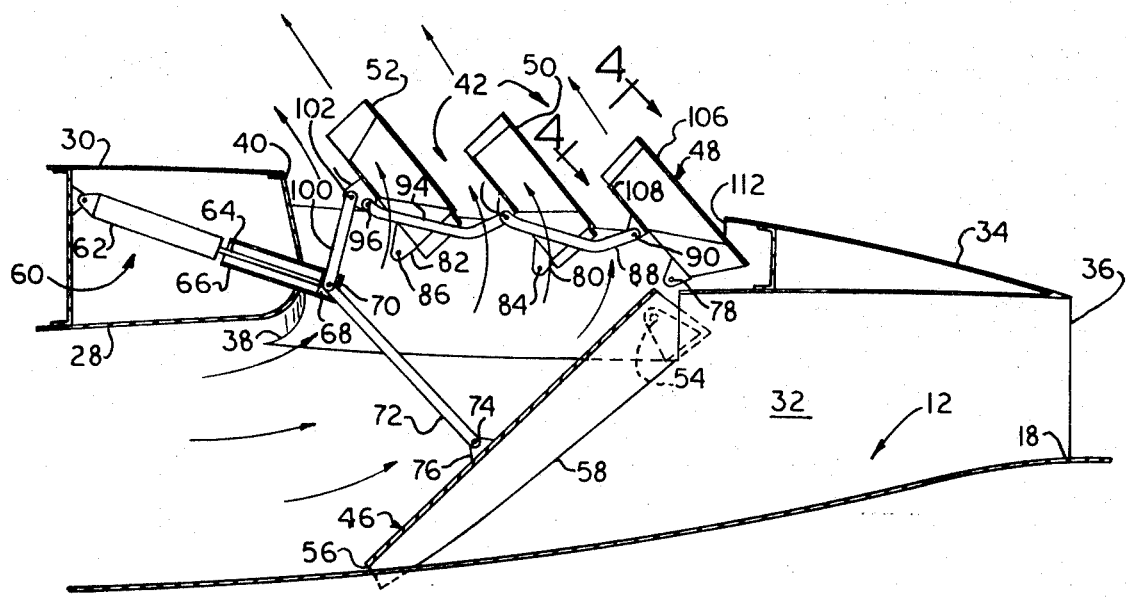
FIG. 3 is a view similar to FIG. 2, with the doors fully deployed.

It is desirable to have a relatively large number of cascades because of their effectiveness in controlling the direction of fluid flow, but an increase in the number of deflector doors would overly complicate the mechanism. The number of cascades is doubled for any given number of deflector doors by the construction illustrated in FIGS. 2 to 4. As best shown in FIG. 4, the door 48 has an outer wall 106 which is arcuate to conform to the contour of the shroud outer wall. A plate or vane 108 extends across the width of the door and is rigidly secured to the door at its flanges 110 to form a very rigid and strong box structure, thus increasing the structural integrity. Turning to FIGS. 2 and 3, it will be seen that the vane terminates forward of the aft wall 112 of the door to provide an opening for the passage of air. Thus, there is one stream of air along the forward face of wall 106 and a second stream of air along the forward face of vane 108 to double the cascade effect.

The door is further strengthened by a fore and aft central support strut 114 fixed to wall 106 and vane 108. This strut serves a dual purpose because it divides the air flow within the door and greatly reduces the swirl which results from the fan action. More than one strut may be used to further divide the air if desired. Since all of the deflector doors are constructed in the same way, the apparatus disclosed actually provides six cascades with the use of only three doors in each set.

The construction disclosed is suitable for in-flight thrust control as well as for full thrust reversal during ground run because the various doors have the proper relation to each other at all degrees of deployment. In an intermediate position, it will be apparent that the blocker doors will permit a substantial rearward flow of air out through the exit 36 while also diverting a substantial part of the jet stream through passage means 42. Thus a high degree of braking may be obtained while a high throttle setting is producing thrust for forward flight. In case of a wave-off or termination of a dive, full power may be regained very quickly.

In the full reverse position of FIG. 3, doors 46 block all rearward exit of air and divert it smoothly to passage means 42, where doors 48, 50, and 52 produce a cascade effect dividing the total exiting stream and delivering it outwardly of the cowl with a substantial forward flow component. As previously stated, the flow area of passage means 42 is greater than the flow area of duct 32 to prevent back pressure. Also doors 48, 50, and 52 open at a greater rate and to a larger degree than doors 46 close down, also to prevent back pressure.

Having thus described the invention, what is claimed as new and useful and desired to be secured by U. S. Letters Patent is:

1. Thrust reversing apparatus for use in combination with a jet engine enclosed in a core cowl and having a fan driven by the engine to produce a propulsion air stream, comprising: a streamlined shroud surrounding the engine and fan and having inner and outer walls spaced from each other throughout at least the major portion of the length of the shroud; the inner wall being radially spaced from the engine cowl to define therewith a generally annular duct for rearward flow to the propulsion air stream delivered by the fan; the shroud terminating forward of the trailing edge of the engine cowl; peripherally arranged outflow passage means downstream of the fan extending through the inner and outer walls of the shroud forward of its trailing edge for lateral flow of the jet air stream during reverse thrust operation; and a plurality of sets of control doors arranged in lateral adjacency around the periphery of the shroud and in said passage means; each set including a blocker door and at least two deflector doors mutually spaced for cascade effect; the blocker door of each set being pivotally mounted on a transverse axis of its aft end and swingtable between stowed position closing a portion of the passage at the inner wall of the shroud and deployed position converging forwardly toward the axis of the engine and with its forward end in contact with the cowl; the side edges of the blocker doors being shaped to move in closely spaced relation to each other when deployed to prevent rearward flow of fan air through the shroud trailing edge exit, and the doors in combination defining a frusto-cone to divert the fan air stream smoothly and gradually outward to the passage means; the deflector doors of each set in stowed position lying in tandem relation outward of the blocker door and closing a portion of the passage means at the outer wall of the shroud; the deflector doors of each set being pivotally mounted at their aft ends on fore and aft spaced transverse axes parallel to the axis of the blocker door, and swingable to deployed positions diverging forwardly from the axis of the engine to produce a cascade effect and direct the air stream diverted by the blocker door of the respective set laterally outward with a forward flow component to produce a reverse thrust, each of said deflector doors being formed with an outer wall curved to conform to the outer wall of the shroud adjacent thereto, and having inwardly extending side flanges and a vane connected to and extending chordally between the side flanges of each deflector door outer wall to confine the air stream between the outer wall and the vane and prevent spillage, each vane terminating at its after end ahead of the after end of its respective outer deflector door wall to define a flow passage between them; the outer wall and vane each defining a separate cascade unit to divide the exiting air flow through each cascade door opening into multiple streams.

2. Apparatus as claimed in claim 1; the flow area of the passage means being substantially greater than the flow area of the fan duct to prevent back pressure in the duct during deployment of the doors.

3. Apparatus as claimed in claim 1; and common means to move all of the doors in one set between stowed and deployed positions.

4. Apparatus as claimed in claim 1; and means to swing the deflector doors through a different angle of deployment than the angle of deployment of the blocker doors.

5. Apparatus as claimed in claim 4; the angle of deployment of the blocker doors being of the order of 45°.

6. Apparatus as claimed in claim 4; the angle of deployment of the deflector doors being of the order of 60°.

7. Apparatus as claimed in claim 1; the outer wall of each door having inwardly extending side flanges meeting the vane to confine the air stream between the outer wall and the vane and prevent spillage.

8. Apparatus as claimed in claim 1; and at least one support strut connected to and extending fore and aft between the outer wall and the vane to guide air flow through the passage and reduce swirl.

* * * * *